Jan. 5, 1965
B. J. ORR
3,164,219
CONTROL MECHANISM FOR VEHICLE ENGINES
Filed Jan. 31, 1962
2 Sheets-Sheet 1
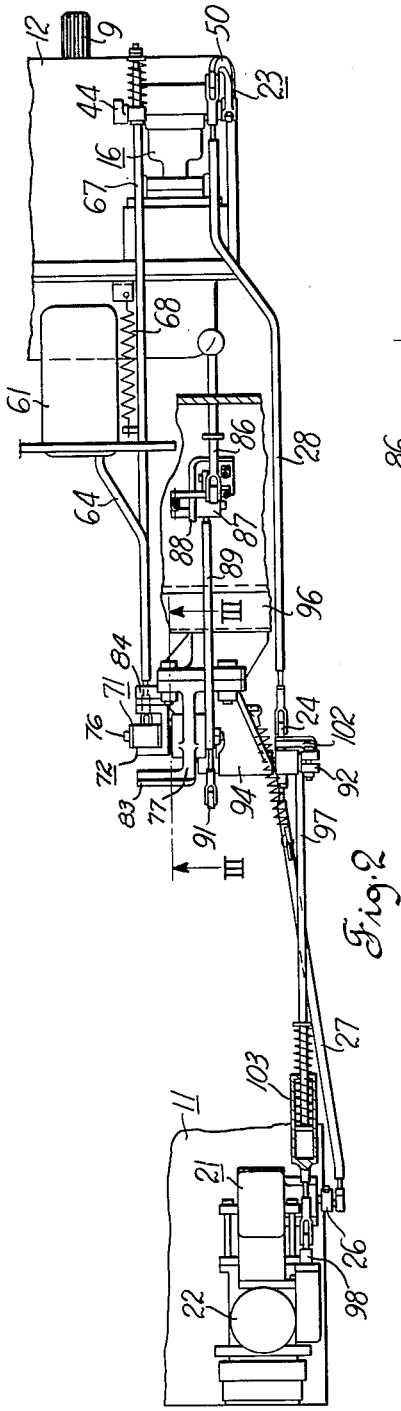
Inventor
Bobby J. Orr
By Charles T. Schunk
Attorney Jan. 5, 1965    B. J. ORR    3,164,219
CONTROL MECHANISM FOR VEHICLE ENGINES
Filed Jan. 31, 1962    2 Sheets-Sheet 2

Inventor
Bobby J. Orr
By Charles L. Schwab
Attorney

United States Patent Office 3,164,219
Patented Jan. 5, 1965

3,164,219
CONTROL MECHANISM FOR VEHICLE ENGINES
Bobby J. Orr, Springfield, Ill., assignor to Allis-Chalmers Manufacturing Company, Milwaukee, Wis.
Filed Jan. 31, 1962, Ser. No. 170,033
8 Claims. (Cl. 180—82.1)

This invention relates to the control mechanism for vehicles with ground speed control and more particularly relates to control mechanism for vehicle engines permitting the operator to select the ground travel speed, to temporarily decelerate and to manually override the ground speed control to insure fuel supply to the engine.

It is an object of this invention to provide a manual control for a tail shaft governor controlling engine speed wherein a friction brake is associated with the manual control so that it will stay in any selected control position without requiring continued manual exertion on the control and wherein the control can be manually moved to an engine decelerating position without changing the tail shaft speed setting of the friction brake.

It is a further object of this invention to provide a control mechanism for an engine controlled by a tail shaft governor which includes a manual control which will permit overriding of the tail shaft governor to correctly position the engine fuel supplying mechanism for engine starting when the hydraulic pressure to the tail shaft governor is too low to permit it to operate properly.

It is a further object of this invention to provide an accelerator-decelerator control for a vehicle utilizing a tail shaft governor for controlling the engine governor, wherein an adjustable friction device with a lost motion function is employed in conjunction with the accelerator-decelerator control which permits temporary deceleration of the engine without adjustment of the friction device.

Figure 3:
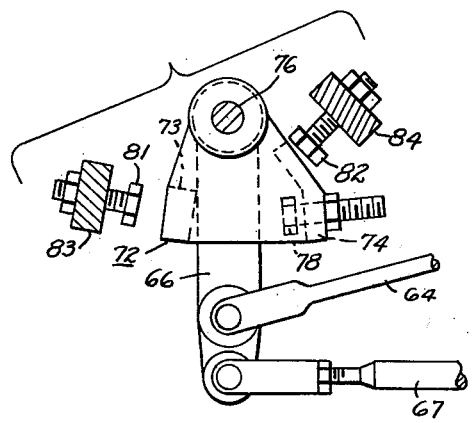
Figure 4:
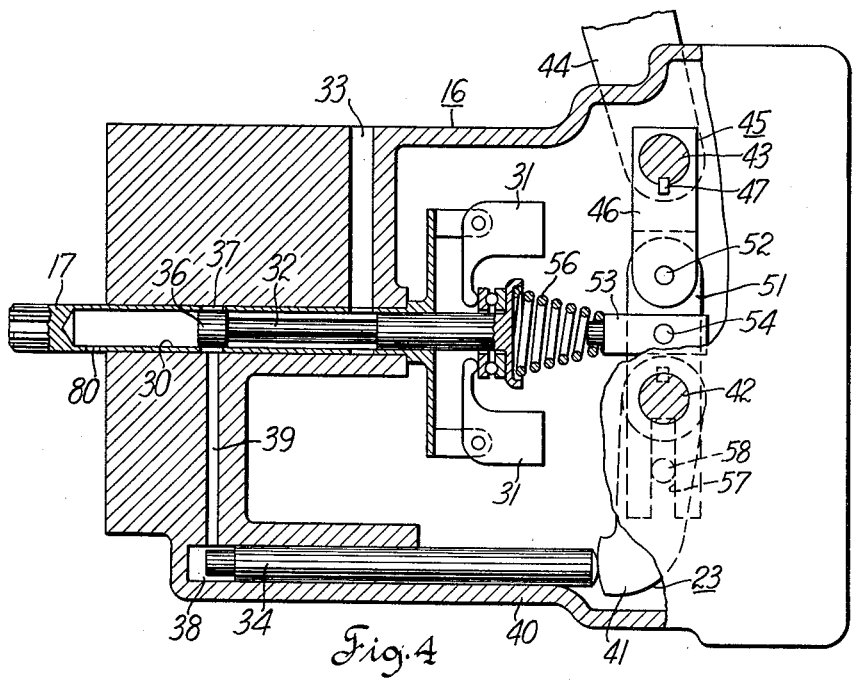

These and other objects of this invention will be apparent when the following description is read in conjunction with the drawings in which:

FIG. 1 is a side view of a control mechanism for a vehicle which incorporates the present invention;
FIG. 2 is a top view of the mechanism shown in FIG. 1;
FIG. 3 is a view taken along the lines III—III in FIG. 2 showing a friction device; and
FIG. 4 is a section view of a tail shaft governor.

In a motor vehicle such as a crawler tractor, it is desirable to provide ground speed control so as to maintain a predetermined travel speed of the vehicle. With a given fuel supply setting the speed of a conventional engine driven vehicle varies in relation to the resistance to travel. The speed change in relation to change in resistance to vehicle travel is even greater in such vehicles utilizing torque converters. To provide a constant ground speed, it has heretofore been suggested that a tail shaft governor be employed to regulate the engine governor and the present control mechanism is concerned with a vehicle so equipped.

Tail Shaft Governor Control of Engine Governor

The structure illustrated in FIGS. 1 and 2 provides a relatively constant speed of the tail shaft or output shaft 9 of the change speed transmission 12. Such control is achieved by the tail shaft governor 16 which is driven at a fixed speed ratio by the output shaft 9. If only a conventional engine governor were employed, it would be necessary for the operator to continually adjust the engine speed in order to achieve a constant ground speed, particularly since a torque converter 15 is employed in the drive train between the engine 11 and the transmission 12. In view of the fact that the machine is usually operating over rough terrain and the operator is often required to give his attention to operating controls for tools such as a dozer, it has been difficult for the operator to hold such prior art vehicles at a desired speed.

The tail shaft governor 16 controls the setting of the engine governor 21 through control linkage including a speed responsive control member 23 of the tail shaft governor, a free swinging lever 24, an engine governor control element 26 and interconnecting rods 27, 28. The engine governor 21 is driven by the compression ignition engine 11 at a speed proportional to the engine speed and is connected in a controlling relation to a fuel injection pump 22. The tail shaft governor 16, engine governor 21 and interconnecting linkage may be considered engine control means for increasing engine speed in response to decreasing output shaft speed and for decreasing engine speed in response to increasing output shaft speed.

Referring to FIG. 4, the tail shaft governor 16 includes fly weights 31 pivotally connected to the governor drive shaft 17. As the speed of the tail shaft 9 increases or decreases, the speed of shaft 17 will increase or decrease proportionally thereby causing the fly weights to swing outwardly or inwardly to shift valve spool 32 disposed in bore 30 of the shaft 17. When the valve spool 32 is shifted to the right to a hydraulic fluid cutoff position, fluid from an engine driven pump, not shown, is prevented from flowing through passages 33, 39 to actuate the plunger 34. In such position, land 36 of spool 32 blocks openings 37 in shaft 17. In the illustrated position of the tail shaft governor 16, the vehicle has attained the ground speed for which the governor has been set. The plunger or hydraulic actuator 34 stops in the position illustrated upon the land 36 blocking flow of fluid to pressure chamber 38. The plunger 34 acts against the speed responsive control member 23. The governor spring, not shown, of the engine governor 21 holds lever 41 of the speed responsive control member 23 against the end of the plunger 34. Interior lever 41 and exterior lever 50 are nonrotatably secured to shaft 42 which is pivoted on the housing 40 of the governor 16. The governor speed setting is controlled by rotating a speed setting control member 45 which includes a shaft 43 rotatably mounted on the housing 40, an exterior control lever 44 fixedly secured to shaft 43, and an interior lever 46 secured by key 47 to shaft 43.

Clockwise rotation of shaft 43 as viewed in FIG. 4 shifts the upper end of a link 51 to the left. Link 51 is pivotally connected to the lower end of lever 46 by a pin 52, is pivotally connected by pin 54 to a yoke 53 and is pivotally connected to lever 41 by a pin 58 slidable in slot 57 of link 51. Clockwise rotation of the speed setting control member 45, compresses spring 56 and as a result increased axial thrust will be required to move the spool valve 32 to the right to the position wherein land 36 blocks pressure fluid from flowing to pressure chamber 38 in which plunger 34 is disposed. When sensitivity of tail shaft governor is changed by clockwise rotation of speed setting control member 45, a higher ground speed (tail shaft speed) is required to create sufficient centrifugal force, by rotation of fly weights 31, to exert the required axial thrust against spring 56 to move spool valve 32 sufficiently to stop movement of plunger 34 to the right and thus the ground speed of the vehicle will be increased.

Operator Control of Tail Shaft Governor

It is desirable to provide a tail shaft governor speed control means which is operable by the operator of the vehicle to selectively set the ground speed. To achieve this result, a manually adjustable means including a foot pedal 61, shown in FIGS. 1 and 2, is provided to control the sensitivity of the tail shaft governor. In addition to the foot pedal 61 pivoted on a bracket 62 to serve as an accelerator-decelerator control, the manually adjustable means for controlling the ground speed setting of the tail shaft governor 16 includes a link 64 which is pivoted to a leg 63 of pedal 61 and to a lever 66 and a rod 67 pivotally interconnecting lever 66 with the speed control lever 44 of the tail shaft governor 16. The manually adjustable means, including the pedal 61 and linkage connecting it to governor 16, is biased rearwardly toward an increased output shaft speed setting by a spring 68 connected to rod 67 and to the housing of the transmission 12. Spring 68 acts in opposition to the tail shaft governor spring 56 to hold link 66 against the high speed abutment 74 of friction device 71.

*Friction Device*

Friction means in the form of friction device 71 is associated with lever 66 for releasably limiting movement of said manually adjustable means toward an increased output shaft speed setting. The friction means 71 is adjustable by the operator through use of the accelerator-decelerator pedal 61 and once set for a predetermined ground speed (output shaft speed) the operator may remove his foot from the pedal 61 and the output shaft speed will be maintained relatively constant by the engine control means which includes the governors 21, 16 and interconnecting linkage.

Referring to FIG. 3, the friction device 71 includes an adjustable control member or stop 72 which has a pair of spaced legs or abutments 73, 74 for engaging lever 66 when moved in opposite directions. The lever 66 is freely pivoted on a stub shaft extension 76 of control member 72 but is biased toward abutment 74 by spring 68. The control member 72 is held frictionally in a bracket 77 in any suitable manner and its abutments 73, 74 and lever 66 provide a lost motion connection permitting deceleration of the engine without changing the ground speed setting of stop 72. One suitable friction device is shown in copending patent application of Bernard L. Zeman, Control Device, Serial Number 162,731, filed December 28, 1961, now Patent No. 3,125,897.

*Increasing the Vehicle Ground Speed*

The engine control means may be set at a higher output shaft speed by the operator rotating the accelerator-decelerator pedal 61 counterclockwise as viewed in FIG. 1. Such action will rotate the lever 66 rearwardly and will carry with it the frictionally held control member 72, shown in FIG. 3, upon contacting the abutment formed by set screw 78 thereof. As the lever 66 rotates rearwardly, the rod 67 shifts to the rear thereby pivoting lever 44 clockwise as viewed in FIGS. 1 and 4. The clockwise rotation of shaft 43 by lever 44 rotates the upper end of link 51 of the tail shaft governor forwardly to compress spring 56 and thereby provide a higher ground speed setting. Oil pressure will cause plunger 34 to move to the right forcing the shaft 42 to move counterclockwise and thereby increase engine speed until the ground speed is sufficient to cause the flyweights to shift valve spool 32 to cut off the flow of oil to chamber 38.

*Deceleration of the Engine*

It is often desirable to temporarily decelerate the engine as when passing close to an obstruction and such deceleration is accomplished by the operator pivoting the foot pedal 61 clockwise thereby moving lever 66 forwardly, as viewed in FIG. 1, out of contact with set screw 78. The amount of deceleration permitted short of changing the position of stop 72, can be adjusted by screwing set screw 78 in or out. As illustrated in FIG. 3, the lever 66 is in a decelerated position. In decelerating, the lever 44 is rotated counterclockwise, as viewed in FIGS. 1 and 4, thereby swinging lever 46 and the pivot pin 52 connected at the bottom thereof to the right which results in reducing the compression of spring 56. The flyweights will then shift the valve spool to the right permitting hydraulic fluid to escape from passage 39 through bleed hole 80 and thus permit plunger 34 to move to the left to a reduced engine speed position.

*Resetting the Ground Travel Speed*

In order to set the tail shaft governor for a lower travel speed (lower output shaft speed) the foot pedal 61 is rotated clockwise until the lever 66 contacts abutment 73 and then it is further rotated clockwise by the operator's foot to move the frictionally held control member 72 to a new lower speed setting position. When the foot pedal 61 is released the lever 66 will be held against cap screw 78 by spring 68. The low speed setting of control member 72 is established by an adjustable set screw 81 and the high speed setting of control member 72 is established by an adjustable set screw 82. The adjustable set screws 81, 82 are threaded into drilled and tapped holes in arms 83, 84 of the support member 77.

*Overriding the Tail Shaft Governor of Cold Starting*

A manual stop control is usually provided for compression ignition engines. This manual linkage is used in the present invention for the additional function of selectively overriding the tail shaft governor when hydraulic pressure thereto is inadequate. As shown in FIGS. 1 and 2, a manual stop control means is provided which includes a reciprocable dashboard control member 86, a bell crank 87 pivotally mounted on a bracket 88 and connected to member 86, a rod 89 interconnecting the bell crank 87 and a lever 91, a shaft 93 to which levers 91 and 92 are nonrotatably secured, a rod 97 and a pump control element 98. The shaft 93 is pivotally mounted on a bracket 94 secured to the frame 96 of the vehicle. The manual stop control means serves as a means for overriding the tail shaft governor by virtue of interconnecting means in the form of lug 102 for interconnecting linkage of the engine control means and the manual stop control means. In the position illustrated, the manual stop control means is in a run position. When the engine is turned over in starting during cold weather, the engine driven pump supplying the tail shaft governor 16 may be required to handle fluid so stiff that sufficient pressure is not exerted against the plunger 34 to move the control lever 26 of the engine governor to a high idle or fuel supplying position. The lug 102 formed on lever 92 moves the control element 26 to a high idle position when manual control member 86 is moved to its engine start position. Overtravel assembly 103 permits the fuel control element to be in its run position when the control member 86 is moved to its starting position.

*Summary*

From the foregoing description, it is apparent that I have provided a manual control for a tail shaft governor wherein a friction device with a lost motion connection is employed which permits the tail shaft governor to be selectively set at a desired speed and wherein the engine may be decelerated without changing the tail shaft governor speed setting of the friction device. In other words, when the manual tail shaft governor speed adjusting pedal 61 is released from a decelerating position, the tail shaft governor speed control linkage will return to the previously set speed adjustment. Further, I have provided a manual tail shaft governor overriding means which permits the operator to adjust the fuel injection pump to a fuel supplying or high idle position should the hydraulic pressure to the tail shaft governor be too low to operate it properly.

Although a single embodiment of this invention has been illustrated and described, it is intended that this invention shall include all embodiments covered by the appended claims.

What is claimed is:

1. A control for an engine connected to an output shaft through a torque converter, comprising: engine control means for increasing engine speed in response to decreasing output shaft speed and for decreasing engine speed in response to increasing output shaft speed, manually adjustable means for varying the sensitivity of said engine control means to thereby change output shaft speed, means biasing said manually adjustable means toward an increased output shaft speed setting, friction means for releasably limiting movement of said manually adjustable means toward an increased output shaft speed setting and a lost motion connection between said friction means and said manually adjustable means permitting deceleration of said engine without moving said friction means and permitting resetting of said friction means through predetermined movement of said manually adjustable means.

2. A control for an engine connected to an output shaft through a torque converter, comprising: engine control means for increasing engine speed in response to decreasing output shaft speed and for decreasing engine speed in response to increasing output shaft speed, manually adjustable means movable in opposite directions to vary the sensitivity of said engine control means to thereby change output shaft speed, a friction device including a support and a movable frictionally held stop on said support, spaced abutments on said stop for engaging said manually adjustable means when the latter is moved in said opposite directions, respectively, and means biasing said manually adjustable means in one of said directions into engagement with one of said abutments, said manually adjustable means being movable from its position of engagement with said one of said abutments in the other of said directions a predetermined distance to decelerate said engine before engaging said other of said abutments.

3. The structure set forth in claim 2 wherein said stop is adjustable in a first direction upon exertion of predetermined manual force against said manual control means to move the latter in said first direction and is adjustable in a second direction opposite to said first direction upon exertion of predetermined manual force against said manual control means to move the latter in said second direction.

4. A control for an engine connected to an output shaft through a torque converter, comprising: a tail shaft governor connected to said output shaft and said engine to increase engine speed in response to decreasing output shaft speed and to decrease engine speed in response to increasing output shaft speed, manually adjustable means for varying the sensitivity of said tail shaft governor and thereby change the output shaft speed setting thereof, means biasing said manually adjustable means toward an increased output shaft speed setting, friction means for releasably limiting movement of said manually adjustable means toward an increased output shaft speed setting and a lost motion connection between said friction means and said manually adjustable means permitting deceleration of said engine without moving said friction means and permitting resetting of said friction means through predetermined movement of said manually adjustable means.

5. An accelerator-decelerator control for a power unit of the type including an output shaft driven by an engine through a torque converter, comprising: a speed sensitive governor connected in constant driven relation to and driven at a fixed speed ratio to said output shaft, fuel supply means for said engine including a control element for varying the fuel being supplied, a speed responsive control member on said governor connected to said control element, a governor speed setting control member on said governor for varying the speed sensitivity of said governor, a manual control member, linkage interconnecting said manual control member and said speed setting control member, means biasing said linkage in the direction of increased speed setting of said speed setting control member, a friction device for releasably limiting movement of said linkage in said direction of increased speed setting and a lost motion connection between said friction device and said linkage permitting deceleration of said engine without changing the position of said friction device.

6. The structure set forth in claim 5 wherein said friction device is movable to one of a plurality of positions upon application of predetermined manual force against said manual control member in a predetermined direction.

7. In a vehicle propelled by an engine through a drive train including a torque converter and change speed transmission having an output shaft adapted for connection to the vehicle traction means, the combination comprising: engine fuel supplying means including a control element movable between low idle and high idle fuel positions and an engine stop control having fuel shutoff and fuel supplying positions, first manual control means connected to said engine stop control and positionable in engine stop, engine running and engine starting positions, overtravel means in the connection between said first manual control means and said engine stop control permitting said first manual control means to be moved to its engine starting position and said engine stop control to simultaneously occupy its fuel supplying position, a tail shaft governor on said vehicle including a speed responsive control member connected to said control element to maintain a set output shaft speed and a hydraulic actuator for moving said control member in response to changes in output shaft speed, a speed setting control member for setting said output shaft speed at any speed within a predetermined range, second manual control means for adjusting said speed setting control member, a friction device including a frictionally held member presenting spaced high speed and low speed abutments in confronting relation to said second manual control means, means biasing said second manual control means toward said high speed abutment, and means interconnecting said first control means and said control element for moving the latter toward a high idle position when said first manual control means is moved to its engine starting position.

8. The structure set forth in claim 5 wherein said control element is movable between low idle and high idle positions and further comprising manual control mechanism for moving said control element toward said high idle position independently of said manual control member.

References Cited in the file of this patent
UNITED STATES PATENTS

| 1,689,893 | Royce | Oct. 30, 1928 |
| 2,283,478 | Warren | May 19, 1942 |